Oct. 25, 1960 P. D. ABBOTT 2,957,532
CUTTING ATTACHMENT FOR HOE
Filed Sept. 11, 1958

INVENTOR
PAUL D. ABBOTT
BY
A. Yates Dowell
ATTORNEY

United States Patent Office 2,957,532
Patented Oct. 25, 1960

2,957,532

CUTTING ATTACHMENT FOR HOE

Paul D. Abbott, P.O. Box 92, Blytheville, Ark.

Filed Sept. 11, 1958, Ser. No. 760,372

2 Claims. (Cl. 172—375)

This invention relates to the cultivation of the soil and to the equipment employed therein, including hand tools and other implements, and especially those having a handle and a cultivating head in the form of a hoe, rake or the like in which the head is composed of tines or independent members.

The invention relates particularly to hand operated cultivation implements used in working around plants where it is necessary to remove weeds or other undesirable growth which ordinarily cannot be readily removed with a hoe or other conventional hand operated tool, and where it is desirable to have an additional cutting edge and disposed at a different angle than the normal head of the implement.

The usual hand tools are not suitable for certain operations such as cutting vines without the head of the tool being caught and requiring pressure to pull it free and sometimes resulting in the breaking of the tool. Also, the structure and shape of the head of the tool is such that it is not suitable for certain work.

It is an object of the invention to overcome the difficulties enumerated and to provide a simple and inexpensive cutting attachment for a hoe or other hand tool which can be readily applied and used jointly therewith for enlarging the use, effectiveness, speed and ease of operation thereof.

Another object of the invention is the provision of a curved auxiliary cutter for application to hoe or other hand tool, and which forms a hook with a cutting edge along the same and which auxiliary cutters can be individually applied to either or both sides of the handle of the tool adjacent to the head thereof.

A further object of the invention is to provide an attachment for a hand tool by which it is possible with greater facility to remove weeds and other growth from beneath low hanging plants and the like.

Figure 1:
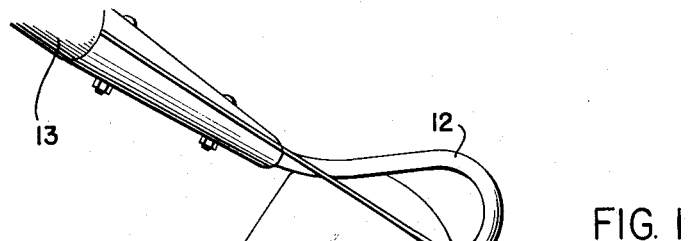
Figure 2:
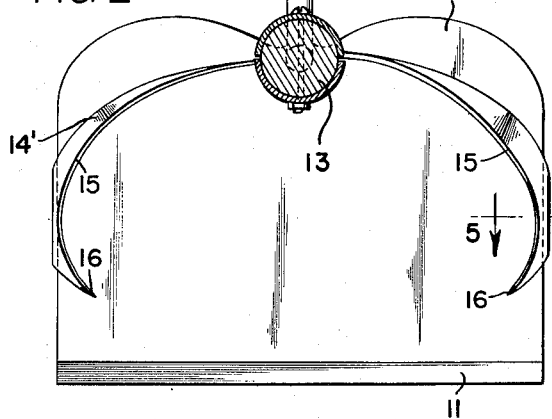
Figure 4:
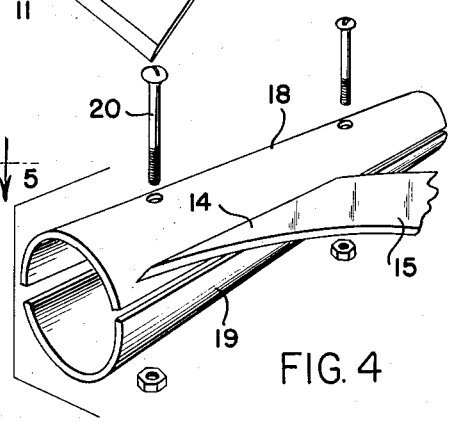
Figure 5:
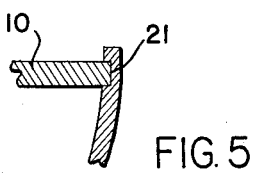
Figure 3:
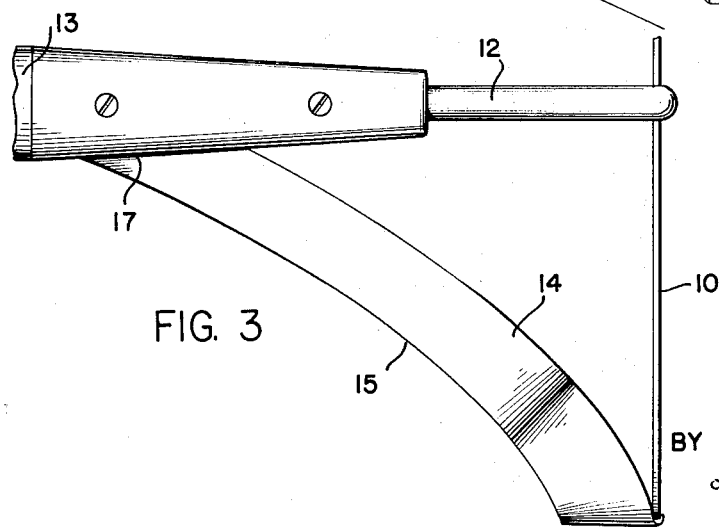

Other objects of the invention will be apparent from the following description taken in conjunction with the accompanying drawing wherein:

Fig. 1 is a perspective illustrating the application of the invention to a conventional hoe;

Fig. 2, an elevation thereof with the handle in section;

Fig. 3, a top plan of a hoe with the invention applied to one side thereof;

Fig. 4, an exploded perspective of the coupling in which the invention is attached to the handle; and Fig. 5, an enlarged fragmentary detail on the line 5—5 of Fig. 2.

Briefly stated, the invention is a curved hook forming blade terminating in a point and having a cutting edge along the top of the same or inside of the hook and of a shape that one end will be located closely adjacent to the side of the handle and its other end will be adjacent the blade or head of a hoe or other hand tool, the device being applicable at one or both sides of the handle of the hand tool.

With continued reference to the drawing a conventional hand tool is provided having a head such as a blade 10 with a cutting edge 11. The blade is supported by means of a curved neck or shank 12 joined to a handle 13, all of ordinary construction.

In order to increase the usefulness of the tool, a cutting attachment is provided in the form of a curved blade 14 having a cutting edge 15 and a tip or point 16. Due to its curvature the blade forms in effect a hook which can be applied around a plant in order to cut the same and in the event that the plant is too tough to cut it can be uprooted by the application of force to the hook by means of the handle.

The upper end of the blade 14 may be secured by welding 17 or in any other desired manner to a reinforcing ferrule or sleeve which may be made of a pair of cooperative sections 18 and 19 as disclosed. The blade is shown as secured to the top section 18 and an oppositely disposed blade may be secured on the opposite side to the lower section 19, and corresponding sections 18 and 19 also may be provided without blades 14 attached. This permits the selective use of a blade 14 at one side or a blade 14' at the opposite side or both of the blades 14 and 14' simultaneously, it being understood of course that the sections 18 and 19 are clamped and fastened to the handle 13 and to the neck 12 by means of bolts and nuts 20 to maintain the parts in assembled relation.

The outer end of the auxiliary blade 14 extends beyond and overlies the head or blade 10 and is provided with a groove 21 in which the side edge of the head is received and held under tension so that there is a mutual supporting and reinforcing action between the head of the tool and the auxiliary blade.

The present invention enhances the usefulness of a conventional hand tool so that a greater amount of work can be accomplished in a shorter time and with less effort and greater effectiveness thereby increasing the capacity and efficiency of the tool. Also, the use of the tool is such that it is particularly adapted for chopping where the growth is tough and under low-hanging plants and the like.

While the attachment has been described for application to a hoe, it is intended for use on other hand tools and on one or both sides of the same and with either blade attached to either the upper or the lower clamping members 18 and 19.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A cutting attachment for a hand tool having a handle and head comprising a blade having an upper end designed for location adjacent to the handle of the tool and a lower end terminating in a point and having the portion of said blade near said point adapted to extend beyond and overlie the edge of the head of the tool, said portion having a groove for receiving said head, the blade of the attachment having a cutting edge and being curved downwardly and forwardly from its upper end to its lower pointed end adjacent said head facilitating the use of the hand tool for cutting purposes.

2. A cutting attachment for a hoe having a blade and handle, comprising a hook-shaped blade having one end designed for location adjacent to the end of the handle of the hoe and its other end terminating in a point with the portion of said blade near said point adapted to overlie the edge of the blade of the hoe, said portion having a groove for receiving the blade of the hoe, said one end of the blade adjacent said end of the handle being provided with a cutting edge, the blade being curved downwardly and forwardly relative to the handle toward the blade of the hoe with said cutting edge projecting rearwardly relative to the handle.

References Cited in the file of this patent

UNITED STATES PATENTS

| | | |
|---|---|---|
| 80,842 | Starr | Aug. 11, 1868 |
| 1,534,659 | Peet et al. | Apr. 21, 1925 |
| 1,865,560 | Lee | Nov. 8, 1932 |

FOREIGN PATENTS

| | | |
|---|---|---|
| 604,912 | France | May 17, 1926 |